United States Patent
Wang

(10) Patent No.: US 9,424,986 B2
(45) Date of Patent: Aug. 23, 2016

(54) MULTI-FUNCTION WIRELESS POWER INDUCTION MOUSEPAD

(71) Applicant: COREMATE TECHNICAL CO., LTD., Taoyuan (TW)

(72) Inventor: Robert Wang, Taoyuan (TW)

(73) Assignee: COREMATE TECHNICAL CO., LTD., Taoyuan (TW)

(*) Notice: Subject to any disclaimer, the term of this patent is extended or adjusted under 35 U.S.C. 154(b) by 441 days.

(21) Appl. No.: 13/968,586

(22) Filed: Aug. 16, 2013

(65) Prior Publication Data

US 2015/0048687 A1    Feb. 19, 2015

(51) Int. Cl.

| H01F 27/42 | (2006.01) |
|---|---|
| H01F 37/00 | (2006.01) |
| H01F 38/00 | (2006.01) |
| H01F 38/14 | (2006.01) |
| G06F 3/039 | (2013.01) |
| H02J 5/00 | (2016.01) |
| H02J 7/02 | (2016.01) |
| H02J 7/00 | (2006.01) |
| G06F 1/26 | (2006.01) |

(52) U.S. Cl.
CPC .............. *H01F 38/14* (2013.01); *G06F 3/0395* (2013.01); *H02J 5/005* (2013.01); *G06F 1/26* (2013.01); *H02J 7/0044* (2013.01); *H02J 7/025* (2013.01)

(58) Field of Classification Search
CPC ........ H01F 38/14; G06F 3/0395; H02J 5/005; H02J 7/025
USPC .......................................................... 307/104
See application file for complete search history.

(56) References Cited

U.S. PATENT DOCUMENTS

| 2003/0085329 A1* | 5/2003 | Goodman | B32B 5/18 248/346.01 |
|---|---|---|---|
| 2004/0189246 A1* | 9/2004 | Bulai | G06F 3/03543 320/108 |
| 2004/0196262 A1* | 10/2004 | Poltorak | G06F 3/033 345/163 |
| 2004/0265546 A1* | 12/2004 | Brophy | B32B 27/06 428/192 |
| 2005/0231470 A1* | 10/2005 | Sugino | G06F 1/181 345/156 |
| 2005/0275629 A1* | 12/2005 | Chin | G06F 3/0395 345/163 |
| 2007/0097078 A1* | 5/2007 | Chin | G06F 3/0317 345/166 |
| 2008/0252601 A1* | 10/2008 | Boys | G06F 3/0395 345/163 |
| 2010/0315350 A1* | 12/2010 | Rene | G06F 3/0395 345/173 |
| 2011/0267266 A1* | 11/2011 | Xiang | G06F 3/0395 345/157 |

* cited by examiner

*Primary Examiner* — Rexford Barnie
*Assistant Examiner* — Rasem Mourad
(74) *Attorney, Agent, or Firm* — Ming Chow; Sinorica, LLC

(57) ABSTRACT

A multi-function wireless power induction mousepad is composed of a lower soft pad, a foam pad and an upper soft pad, which is flexible and can be rolled for storage. A power module is embedded on the foam pad. The power module includes a power induction coil and a USB socket. The power module supplies power to a mouse having a charging induction coil or a cell phone to be charged. The present invention can cooperate with other peripheral devices, such as a display, a touch-control panel, an LED panel, a writing panel, electronic paper, electronic message board and the like, according to the demand of the user, providing a multi-function effect.

3 Claims, 10 Drawing Sheets

MULTI-FUNCTION WIRELESS POWER INDUCTION MOUSEPAD

BACKGROUND OF THE INVENTION

1. Field of the Invention

The present invention relates to a mousepad, and more particular to a multi-function wireless power induction mousepad.

2. Description of the Prior Art

A mousepad is essential to computer peripheral devices. Through the special design of the surface of the mousepad, the mouse can slide correctly on the mousepad to bring accurate movement of the cursor so that the user can input commands through the mouse.

However, the mousepads on the market only provide the function that the mouse slides thereon, without other additional functions. If the mousepad has other functions to enhance its added value, the user may have more interest in purchasing the mousepad. Accordingly, the inventor of the present invention has devoted himself based on his many years of practical experiences to solve these problems.

SUMMARY OF THE INVENTION

The primary object of the present invention is to provide a multi-function wireless power induction mousepad. The mousepad comprises a power module having a power induction coil for transmitting power to a mouse or a cell phone in a wireless way to achieve a multi-function effect.

In order to achieve the aforesaid object, the multi-function wireless power induction mousepad of the present invention is composed of a lower soft pad, a foam pad and an upper soft pad, which is flexible and can be rolled for storage. A power module is embedded on the foam pad. The power module includes a power induction coil and a USB socket. The power module supplies power to a mouse having a charging induction coil or a cell phone to be charged. The present invention can cooperate with other peripheral devices, such as a display, a touch-control panel, an LED panel, a writing panel, electronic paper, electronic message board and the like, according to the demand of the user, providing a multi-function effect.

DETAILED DESCRIPTION OF THE PREFERRED EMBODIMENTS

Embodiments of the present invention will now be described, by way of example only, with reference to the accompanying drawings.

Figure 1:
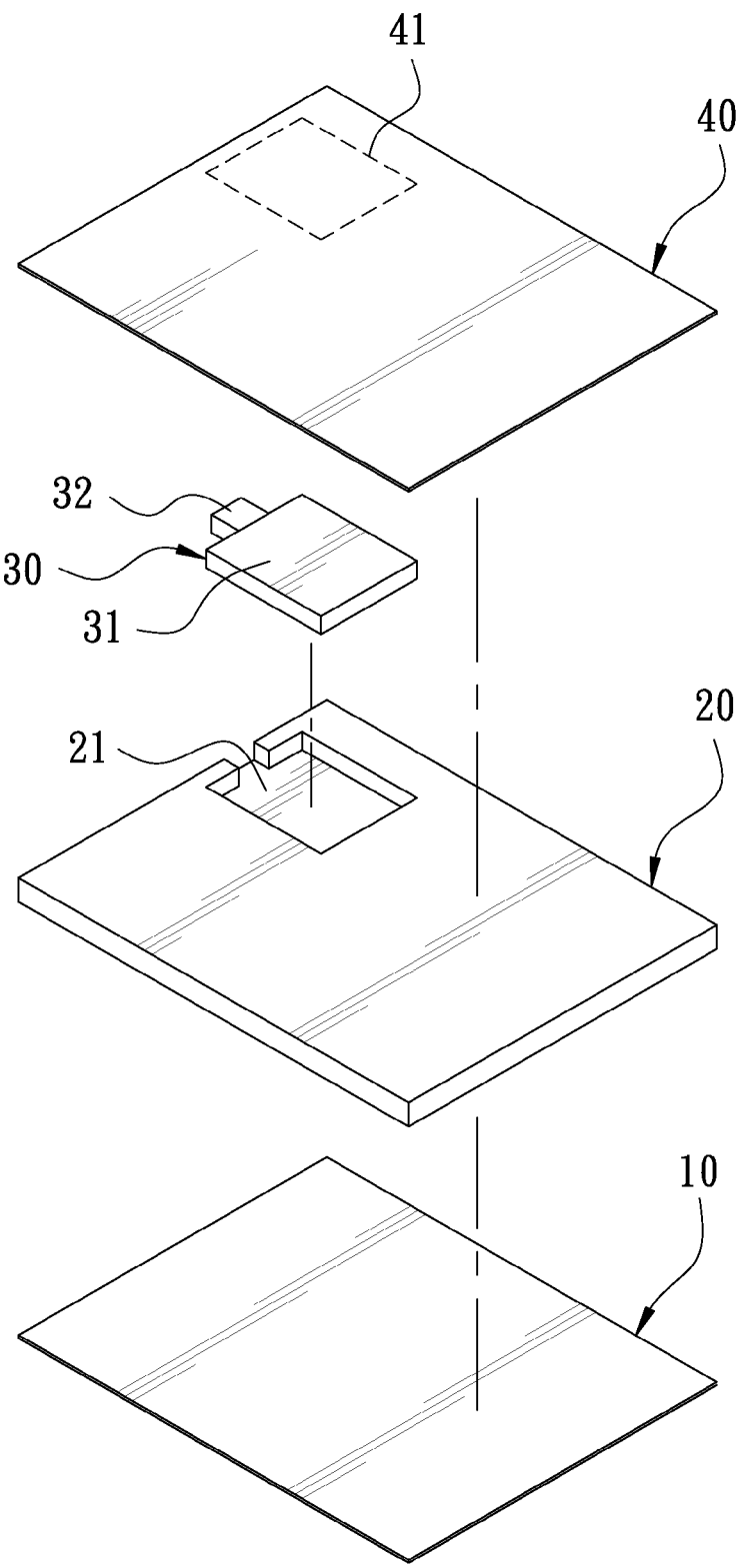
FIG. 1 is an exploded view according to a first embodiment of the present invention.
Figure 2:
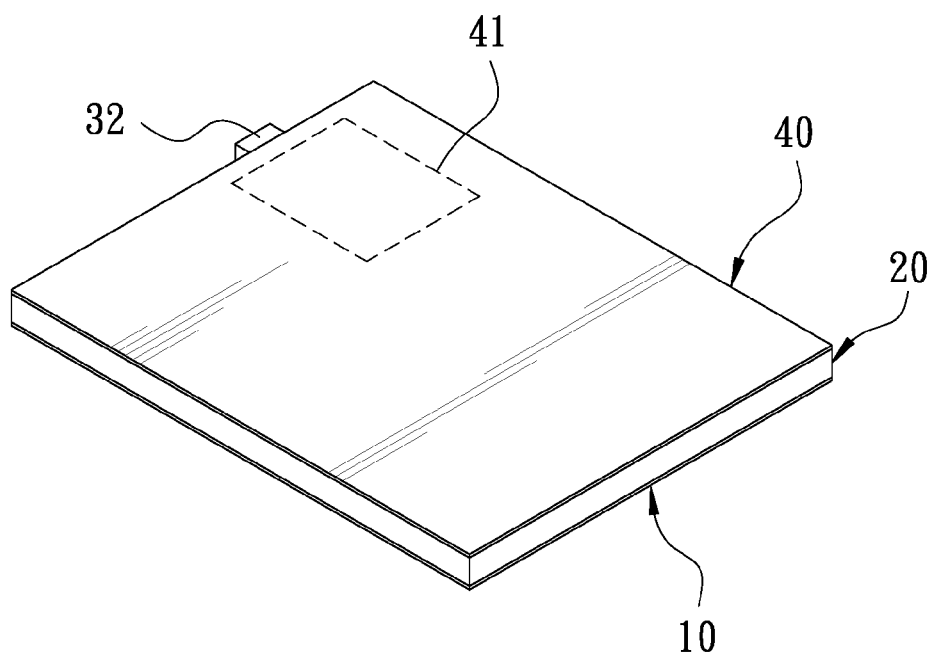
FIG. 2 is a perspective view according to the first embodiment of the present invention.
Figure 3:
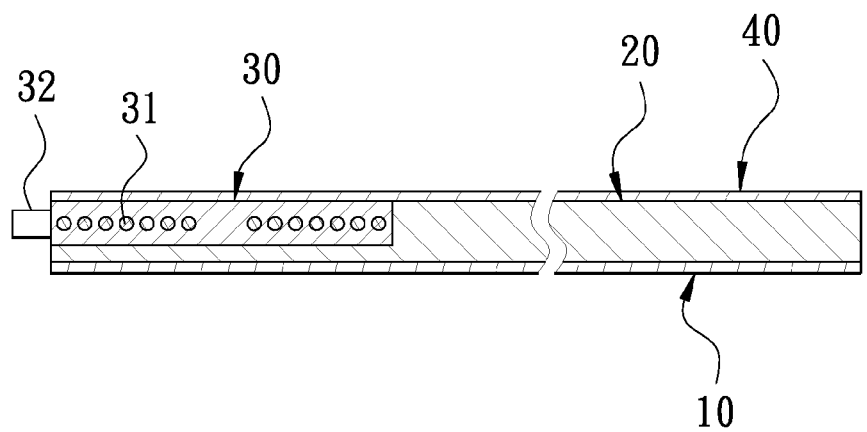
FIG. 3 is a sectional view according to the first embodiment of the present invention.

FIG. 1 is an exploded view according to a first embodiment of the present invention. FIG. 2 is a perspective view according to the first embodiment of the present invention. FIG. 3 is a sectional view according to the first embodiment of the present invention. The present invention comprises a lower soft pad 10, a foam pad 20, a power module 30, and an upper soft pad 40.

The lower soft pad 10 is as the base material of the bottom of the mousepad. The lower soft pad 10 is flexible. The bottom of the lower soft pad 10 has an anti-skidding effect.

The foam pad 20 is disposed on top of the lower soft pad 10 and corresponds in size to the lower soft pad 10. The foam pad 20 has a first accommodation trough 21 thereon. The first accommodation trough 21 is located at one corner of a front end of the foam pad 20.

The power module 30 is embedded in the first accommodation trough 21 of the foam pad 20 and corresponds in size to the first accommodation trough 21. The power module 30 comprises a power induction coil 31 and a USB socket 32. The USB socket 32 is electrically connected with the power induction coil 31. The opening of the USB socket 32 is located out of the outer side of the foam pad 20 for connecting an external power or a transmission signal.

The upper soft pad 40 is disposed on top of the foam pad 20 and corresponds in size to the lower soft pad 10. The upper soft pad 40 is as the top material of the mouse pad. The surface of the upper soft pad 40 has a frame line corresponding in position to the power induction coil 31 for marking a charging area.

Figure 4:
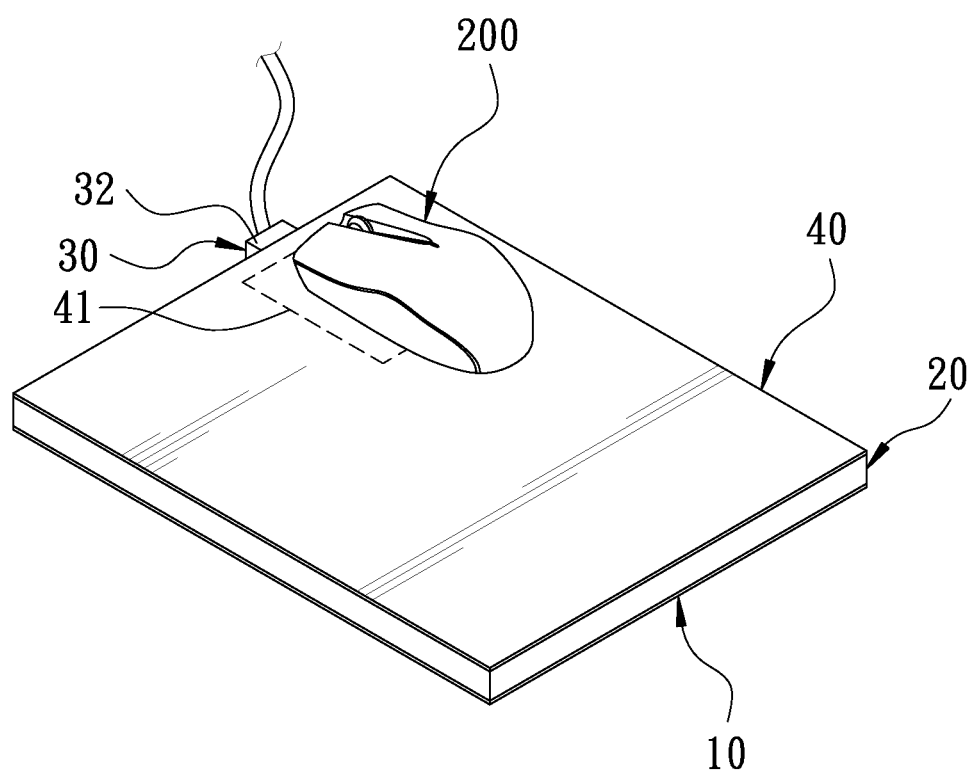
FIG. 4 is a schematic view showing the use of the first embodiment of the present invention.

FIG. 4 is a schematic view showing the use of the first embodiment of the present invention. Referring to FIG. 3, the USB socket 32 of the present invention is first connected with an external power for the power module 30 to generate electricity. The present invention can be used as a mousepad for a wireless mouse 200 with a charging induction coil. Therefore, when the wireless mouse 200 needs to be charged, the wireless mouse 200 is placed within the frame line 41 of the upper soft pad 40. The wireless mouse 200 is charged through the power induction coil 31 of the power module 30. It is convenient for use.

Figure 5:
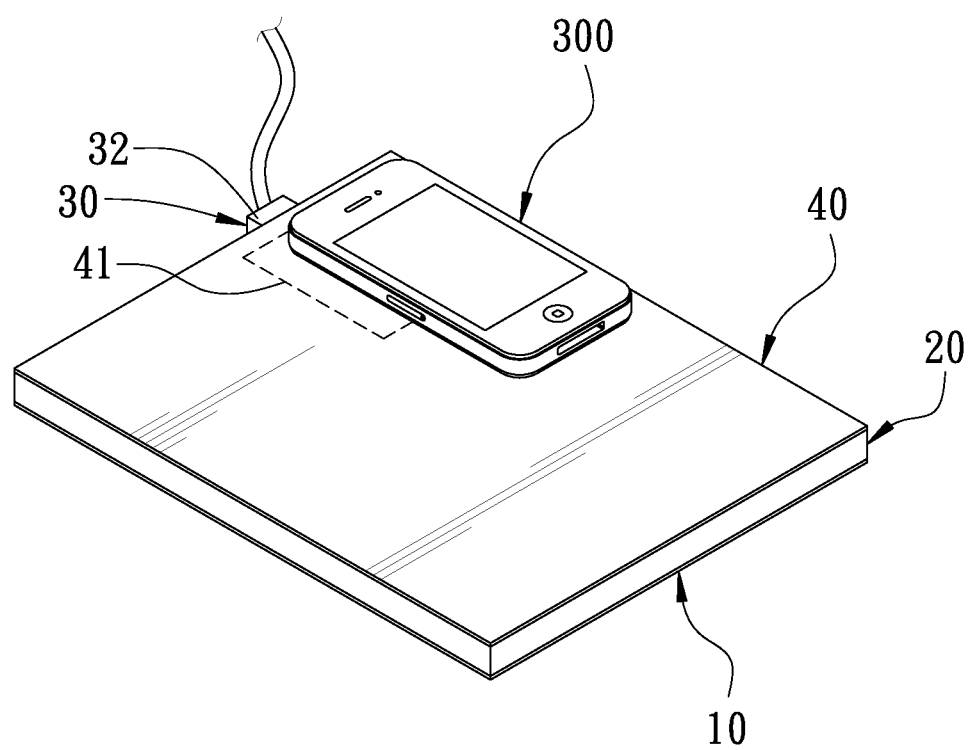
FIG. 5 is a schematic view showing another use of the first embodiment of the present invention.

FIG. 5 is a schematic view showing another use of the first embodiment of the present invention. Referring to FIG. 3, a cell phone 300 having a charging induction coil can be charged by the power module 30 having the power induction coil 31 of the present invention to enhance the use value of the present invention.

Figure 6:
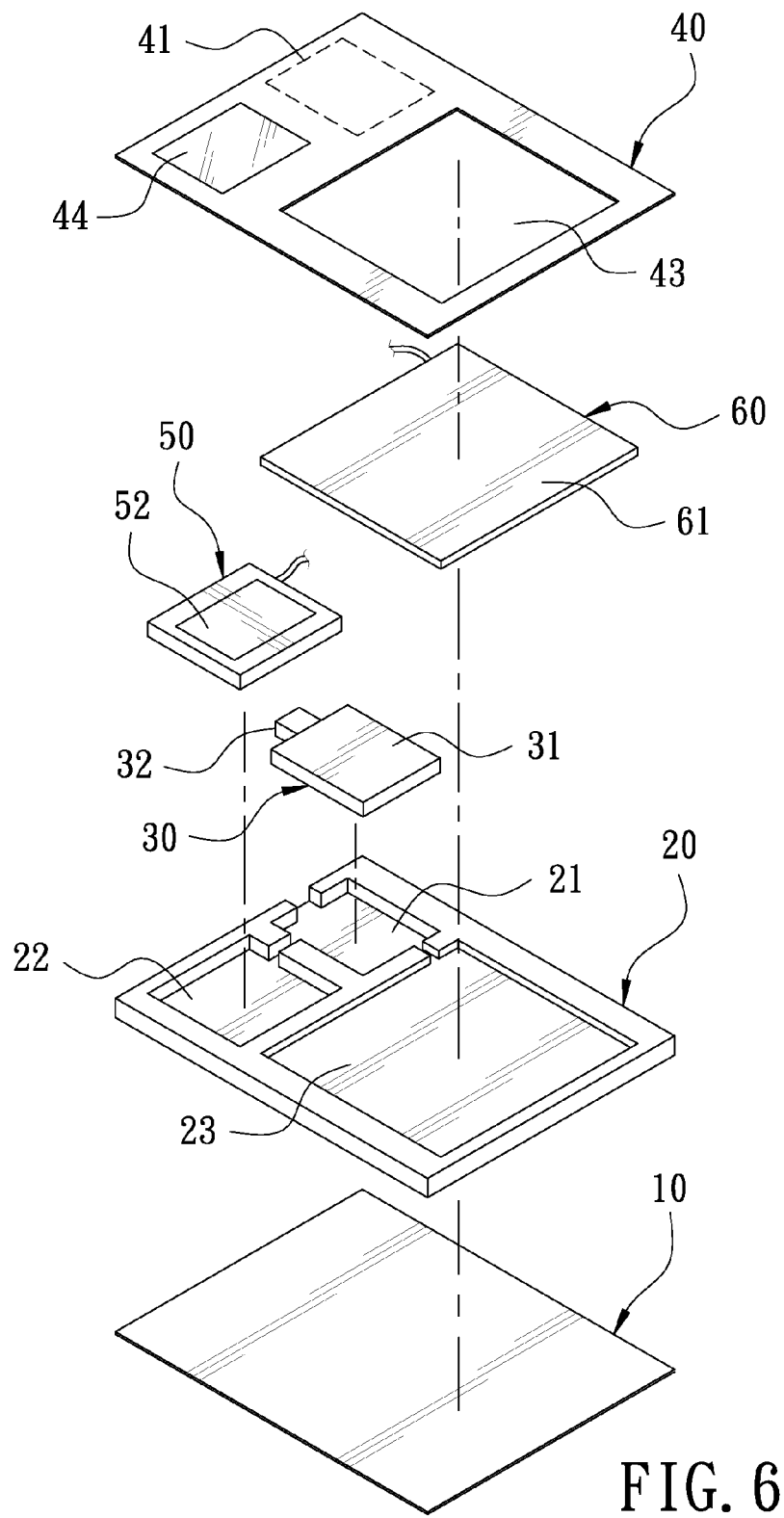
FIG. 6 is an exploded view according to a second embodiment of the present invention.
Figure 7:
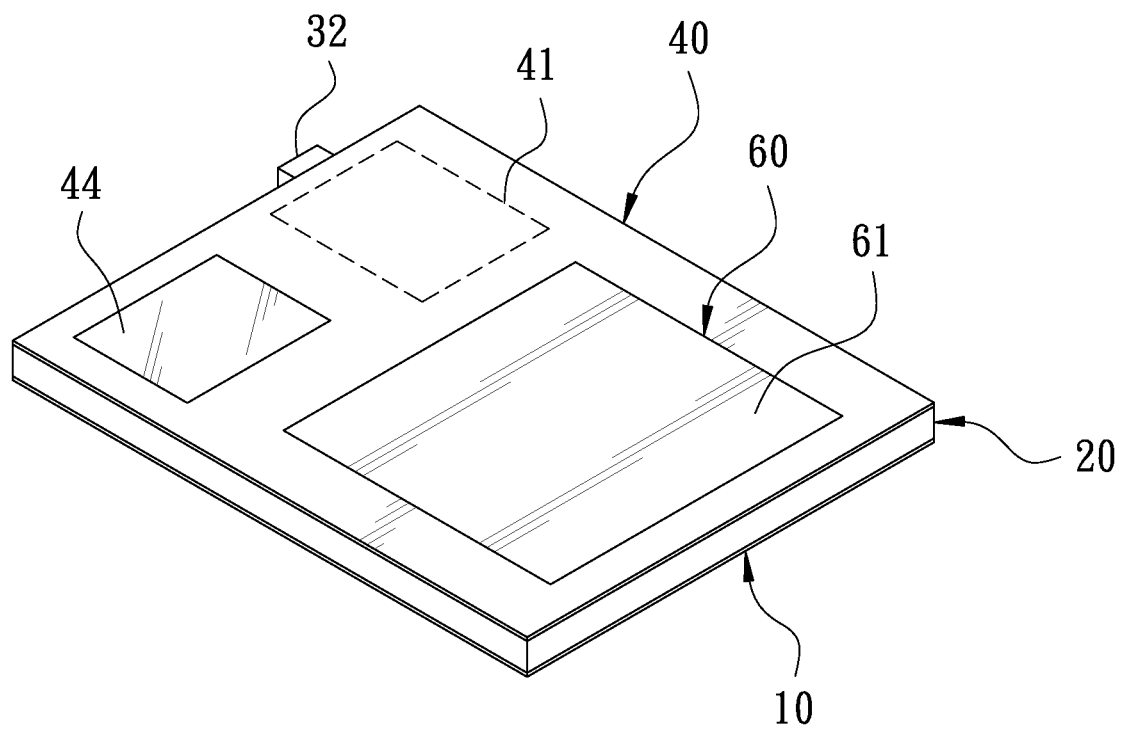
FIG. 7 is a perspective view according to the second embodiment of the present invention.

FIG. 6 is an exploded view according to a second embodiment of the present invention. FIG. 7 is a perspective view according to the second embodiment of the present invention. The foam pad 20 further has a second accommodation trough 22. The second accommodation trough 22 is located at another corner of the front end of the foam pad 20. The upper soft pad 40 has a transparent window 44 corresponding in position to the second accommodation trough 22.

A display module 50 is embedded in the second accommodation trough 22 of the foam pad 20, and is electrically connected with the power module 30. The display module 50 has a display screen 52 thereon. The present invention can show the charging state through the display screen 52 of the display module 50.

The foam pad 20 further has a third accommodation trough 23. The third accommodation trough 23 is located at the center of the foam pad 20. The upper soft pad 40 has an opening 43 corresponding in position to the third accommodation trough 23.

A touch-control module 60 is embedded in the third accommodation trough 23 of the foam pad 20, and is electrically connected with the power module 30. The touch-control module 60 has a touch-control panel 61 thereon. The touch-control panel 61 is exposed out of the opening 43 of the upper soft pad 40. Thereby, the present invention can be used as not only a mousepad but also a touch-control panel. The power module 30 supplies power to achieve the multi-function object.

Figure 8:
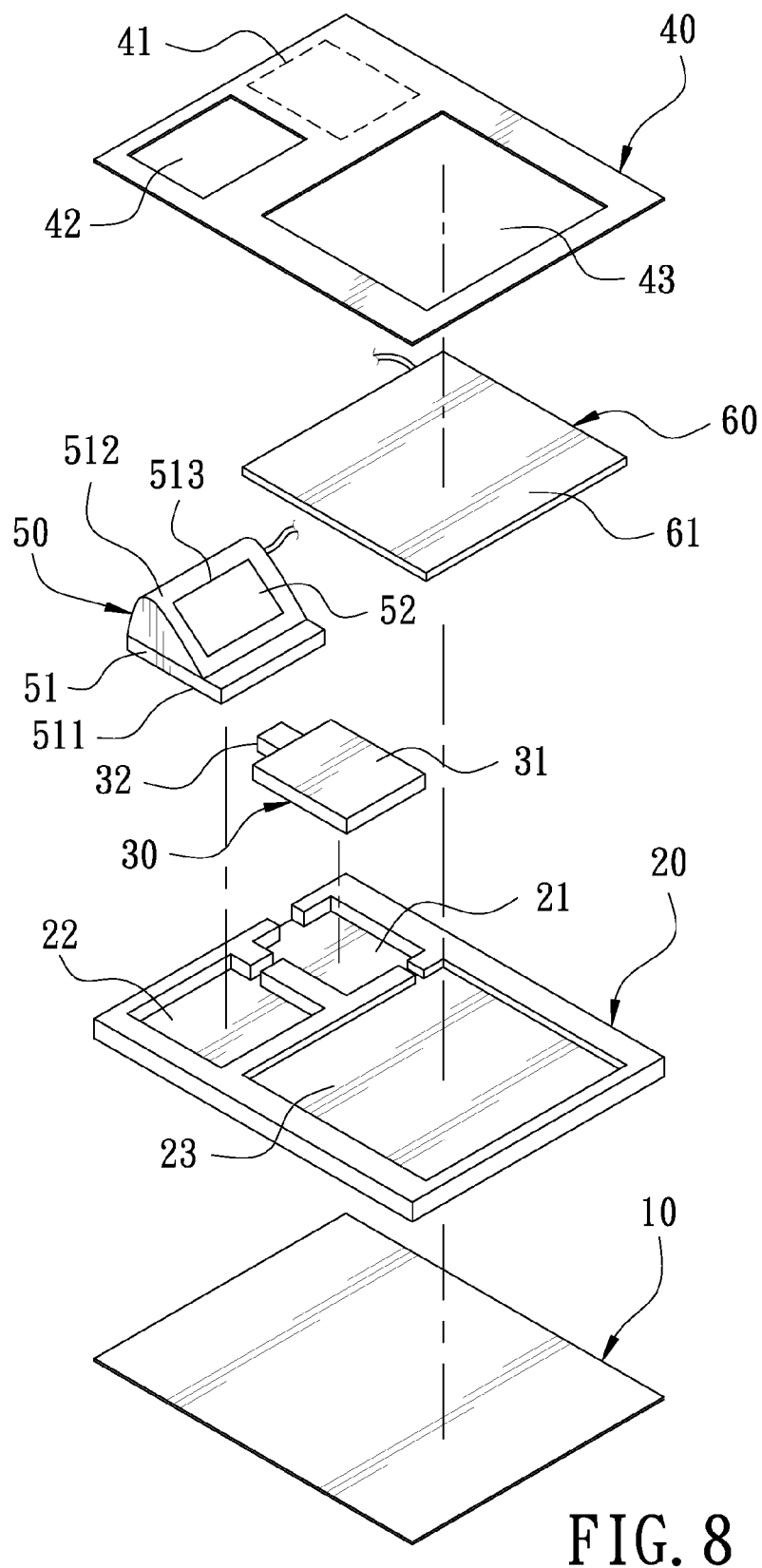
FIG. 8 is an exploded view according to a third embodiment of the present invention.
Figure 9:
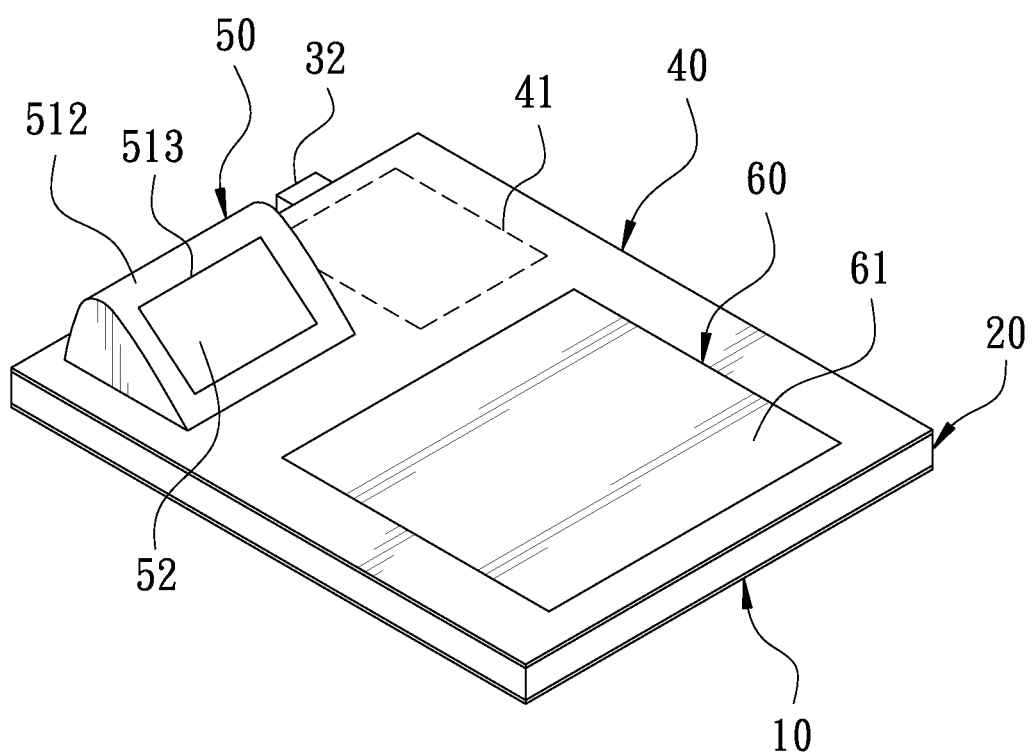
FIG. 9 is a perspective view according to the third embodiment of the present invention.

FIG. 8 is an exploded view according to a third embodiment of the present invention. FIG. 9 is a perspective view according to the third embodiment of the present invention. The foam pad 20 further has a second accommodation trough 22. The second accommodation trough 22 is located at another corner of the front end of the foam pad 20. The upper soft pad 40 has an opening 42 corresponding in position to the second accommodation trough 22.

A display module 50 is embedded in the second accommodation trough 22 of the foam pad 20, and is electrically connected with the power module 30. The display module 50 comprises a casing 51. The casing 51 has a base 511 to be embedded in the second accommodation trough 22 of the foam pad 20. The display module 50 further comprises a protruding portion 512 formed on the base 511 of the casing 51. The protruding portion 512 protrudes out of the second accommodation trough 22 of the foam pad 20. One side of the protruding portion 512 has an inclined window 513. The display module 50 has a display screen 52. The display screen 52 is located on the window 513. The present invention can show the charging state through the display screen 52 of the display module 50.

The foam pad 20 further has a third accommodation trough 23. The third accommodation trough 23 is located at the center of the foam pad 20. The upper soft pad 40 has an opening 43 corresponding in position to the third accommodation trough 23.

A touch-control module 60 is embedded in the third accommodation trough 23 of the foam pad 20, and is electrically connected with the power module 30. The touch-control module 60 has a touch-control panel 61 thereon. The touch-control panel 61 is exposed out of the opening 43 of the upper soft pad 40. Thereby, the present invention can be used as not only a mousepad but also a touch-control panel. The power module 30 supplies power to achieve the multi-function object.

Figure 10:
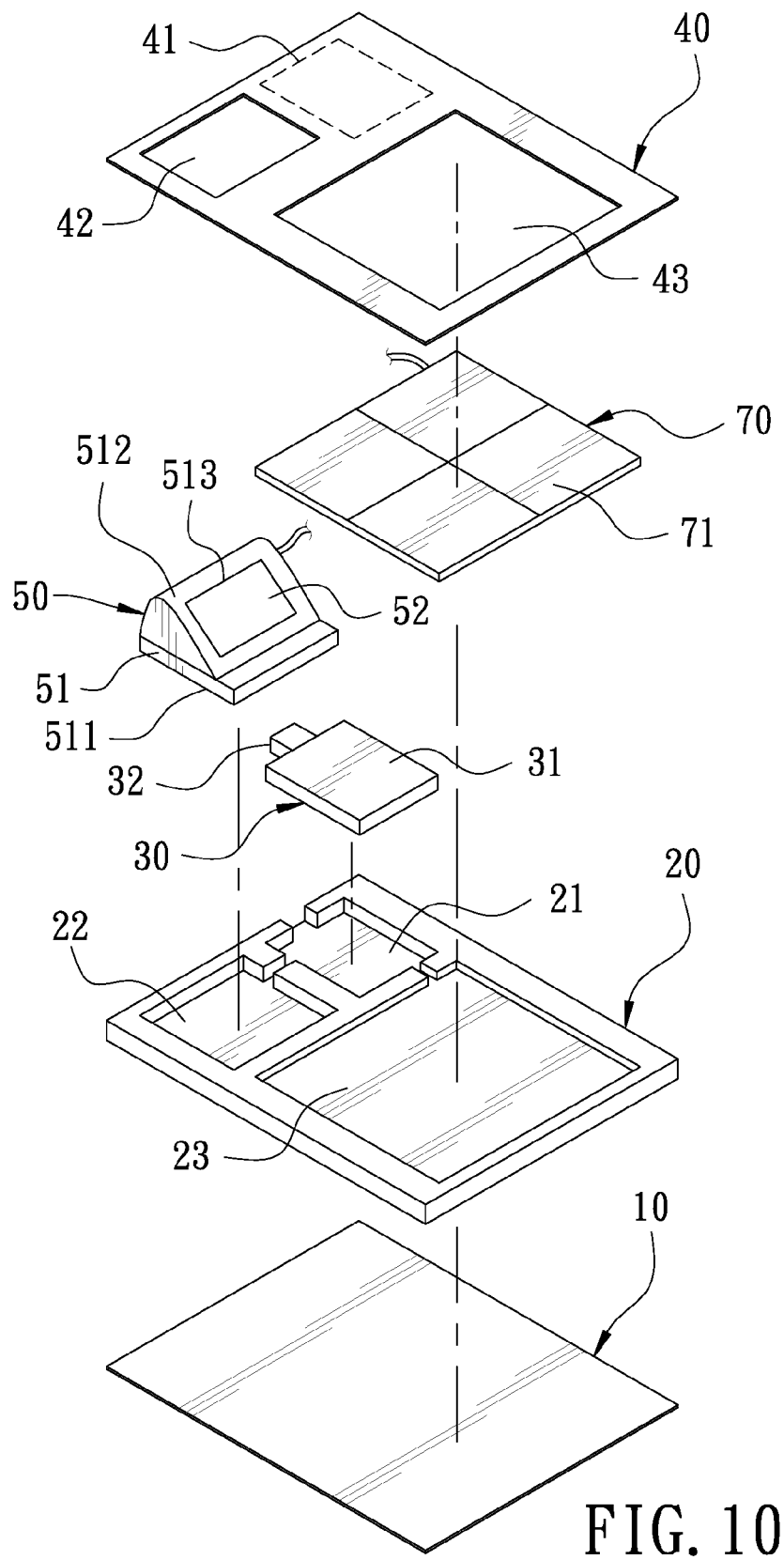
FIG. 10 is an exploded view according to a fourth embodiment of the present invention.
Figure 11:
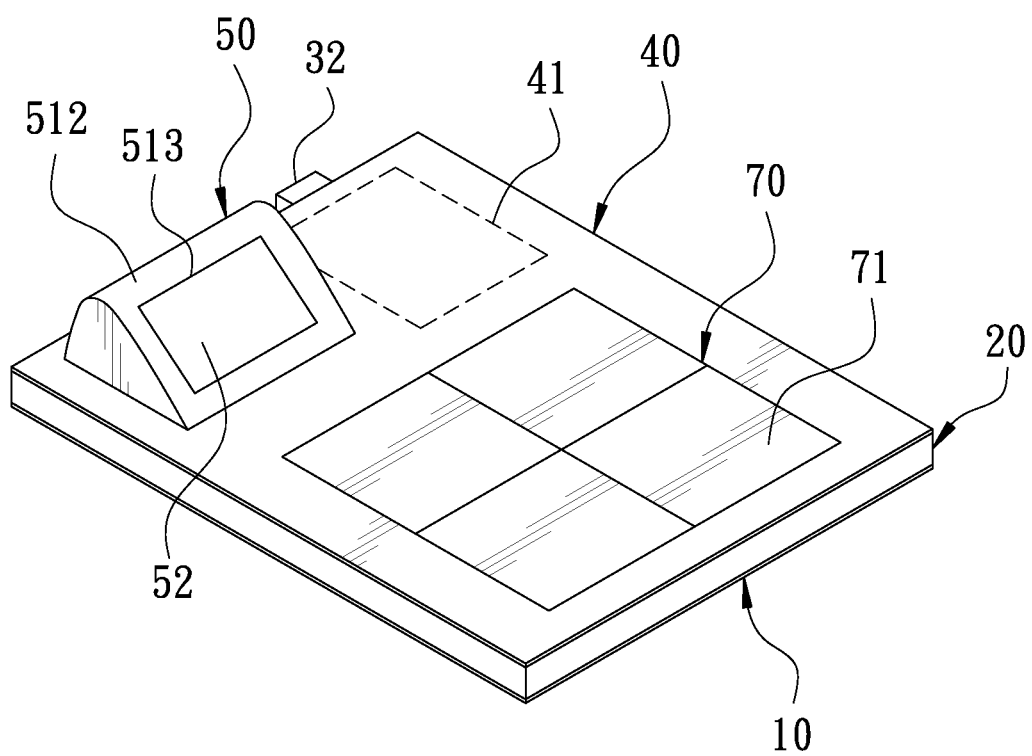
FIG. 11 is a perspective view according to the fourth embodiment of the present invention.

FIG. 10 is an exploded view according to a fourth embodiment of the present invention. FIG. 11 is a perspective view according to the fourth embodiment of the present invention. An LED panel 70 is provided in the third accommodation trough 23 of the foam pad 20. The LED panel 70 is composed of illuminating blocks 71 in different colors to identify the position of the mousepad through different illuminating colors.

It is noted that the mousepad of the present invention can cooperate with the aforesaid touch-control panel or LED panel as well as a writing panel, electronic paper, electronic message board or the like for replacement according to the demand of the user.

The features and effects of the present invention are described as follow:

1. The upper and lower soft pads 10, 40, the foam pad 20 and the power induction coil 31 of the present invention are made of flexible materials so the present invention can be curved or rolled. It is convenient for use.

2. The present invention comprises a power module 30. The power module 30 supplies power to the power induction coil 31 to the mouse 200 having an induction coil or the cell phone 300 to be charged so as to enhance its use value.

3. The mousepad of the present invention has a power module 30. The power module 30 comprises a USB socket 32 for connecting an external power or a transmission signal. The present invention can cooperate with other peripheral devices, such as a touch-control panel, an LED panel, a writing panel, electronic paper, electronic message board and the like, for replacement according to the demand of the user. There is no need for addition purchase or installation.

4. The middle layer of the mousepad of the present invention is a foam pad 20. The power module 30 or combined peripheral devices can be embedded in the foam pad 20. That is to say, the foam pad 20 is cut for a desired accommodation trough to receive the power module 30 or combined peripheral devices, such that the surface of the mousepad is still kept flat. It is convenient to manufacture and use the mousepad, not occupying a lot of space.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-function wireless power induction mousepad, comprising:
   a lower soft pad, as a base material of the mousepad;
   a foam pad disposed on top of the lower soft pad, the foam pad having a first accommodation trough thereon;
   a power module embedded in the first accommodation trough of the foam pad and corresponding in size to the first accommodation trough, the power module comprising a power induction coil and a USB socket, the USB socket being electrically connected with the power induction coil, the USB socket being located out of an outer side of the foam pad;
   an upper soft pad disposed on top of the foam pad, the upper soft pad being as a top material of the mouse pad;
   the foam pad further has a second accommodation trough;
   the upper soft pad having an opening corresponding in position to the second accommodation trough;
   a display module being embedded in the second accommodation trough of the foam pad and electrically connected with the power module;
   the display module having a display screen;
   the display screen being exposed out of the opening of the upper soft pad;
   the display module comprises a casing;
   the casing having a base to be embedded in the second accommodation trough of the foam pad;
   the display module further comprising a protruding portion formed on the base;
   the protruding portion protruding out of the second accommodation trough of the foam pad;
   one side of the protruding portion having an inclined window; and
   the display screen being located on the window.

2. The multi-function wireless power induction mousepad as claimed in claim 1, wherein the foam pad further has a third accommodation trough, the upper soft pad having an opening corresponding in position to the third accommodation trough, a touch-control module being embedded in the third accommodation trough of the foam pad and electrically connected with the power module, the touch-control module having a touch-control panel thereon, the touch-control panel being exposed out of the opening of the upper soft pad.

3. The multi-function wireless power induction mousepad as claimed in claim 1, wherein an upper surface of the upper soft pad has a frame line corresponding in position to the power induction coil for marking a charging area.

* * * * *